United States Patent [19]

Kierbow et al.

[11] 4,427,133
[45] Jan. 24, 1984

[54] ADDITIVE MATERIAL METERING SYSTEM WITH WEIGHING MEANS

[75] Inventors: Gerald C. Kierbow; Herbert J. Horinek, both of Duncan, Okla.

[73] Assignee: Halliburton Company, Duncan, Okla.

[21] Appl. No.: 263,016

[22] Filed: May 12, 1981

Related U.S. Application Data

[62] Division of Ser. No. 114,628, Jan. 23, 1980, abandoned.

[51] Int. Cl.³ ............................................. G01G 7/00
[52] U.S. Cl. ..................................... 222/77; 222/135; 222/164; 406/32
[58] Field of Search ...................... 406/32, 53, 65, 120, 406/124, 125, 126; 222/56, 77, 160, 164, 135

[56] References Cited

U.S. PATENT DOCUMENTS

| | | | |
|---|---|---|---|
| 3,181,482 | 5/1965 | Heth et al. | |
| 3,807,602 | 4/1974 | Meichsner | 222/77 X |
| 3,822,809 | 7/1974 | Foucalt et al. | 222/413 X |
| 4,111,272 | 9/1978 | Ricciardi et al. | 222/71 |
| 4,111,335 | 9/1978 | Arya et al. | 222/57 |
| 4,111,336 | 9/1978 | Ward et al. | 222/63 X |

OTHER PUBLICATIONS

*Bulletin of the University of Utah*, vol. 53, No. 26, Bulletin No. 123 (Nov. 1964) entitled "Storage and Flow of Solids", by Andrew W. Jenike, Mar. 1967.

Primary Examiner—David A. Scherbel
Attorney, Agent, or Firm—Lucian Wayne Beavers; Joseph A. Walkowski; Thomas R. Weaver

[57] ABSTRACT

An additive material storage and metering system includes a transportable frame having a plurality of dry material storage bins mounted thereon. The plurality of dry material storage bins includes smaller dry material storage bins and larger dry material storage bins. The metering system for the larger dry material storage bins has a flow rate range varying from a low end to a high end. The metering system for the smaller dry material storage bins has a second flow rate range varying from a low end to a high end. The low end of the second range is lower than the low end of the first range, and the high end of the second range is between the low and high ends of the first range, so that any given dry material may be dispensed at any rate within an overall flow rate range from the low end of the second range to the high end of the first range by placing said material in the proper dry material storage bin. The dry material storage bins are partially supported from the transportable frame by load cells which are mounted on an extendable hydraulic cylinder so that the load cells may be withdrawn from engagement with the storage bin when the transportable frame is being moved, and may be extended into load supporting engagement with the storage bin when transportable frame is at rest.

14 Claims, 18 Drawing Figures

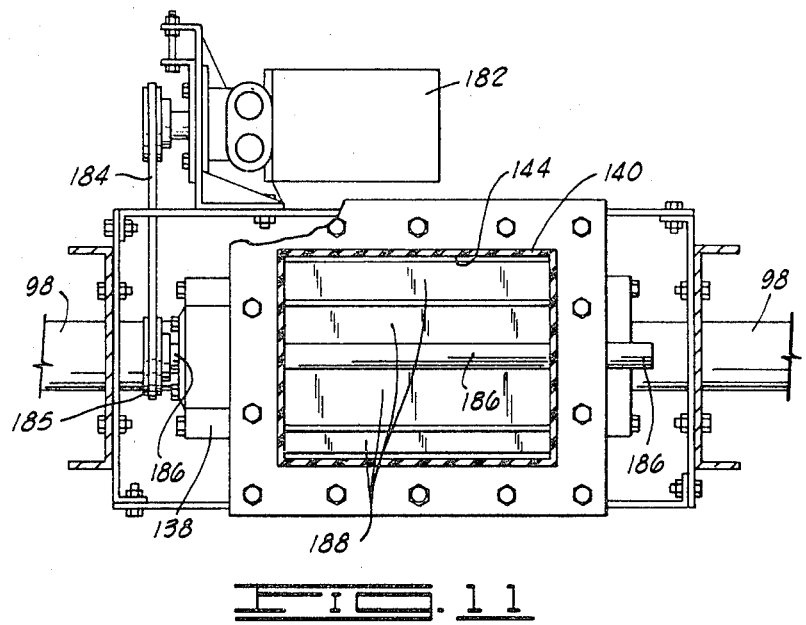
FIG. 11
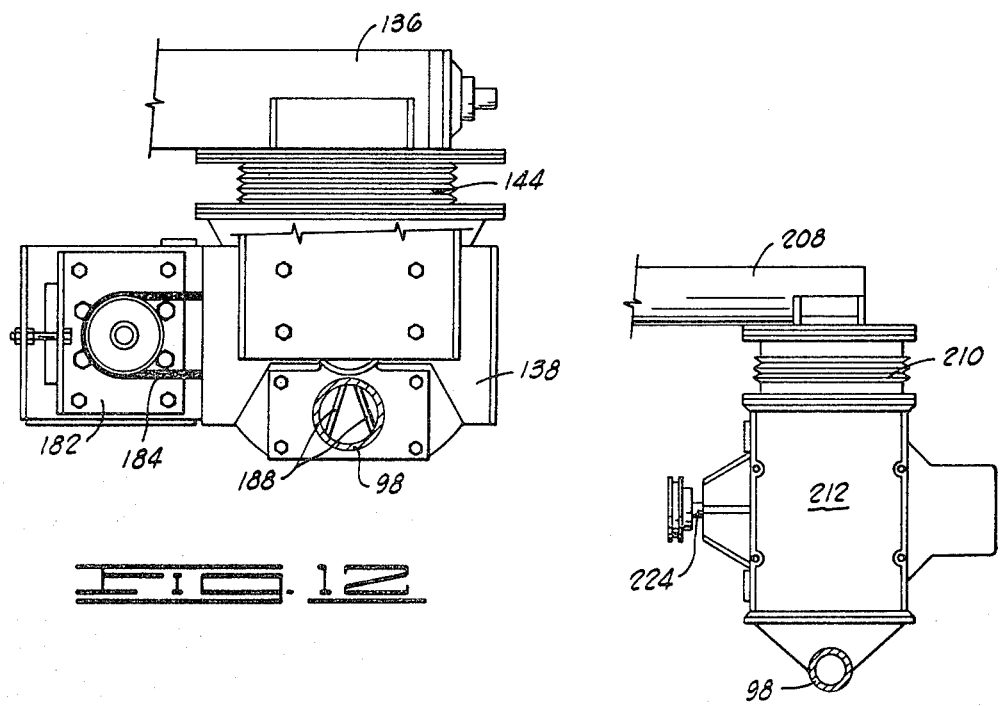
FIG. 12
FIG. 13

ADDITIVE MATERIAL METERING SYSTEM WITH WEIGHING MEANS

This application is a division of our U.S. Application Ser. No. 114,628 filed Jan. 23, 1980, now abandoned.

The present invention relates generally to systems for the storage and metering of material, and more particularly, but not by way of limitation, to such systems adapted for use in metering additives to be mixed with a fluid for pumping down an oil well.

During oil field drilling and production operations, it is often necessary to pump large volumes of fluid materials down the oil well for performing treating or other oprations on the well. One example is a fracturing operation where large volumes of gell are pumped under very high pressures down into the oil well and into the producing formation to fracture the formation. Another example of such operations includes cementing operations where large volumes of cement are pumped down the oil well and into the annulus between the casing and borehole for permanently sealing the annulus.

During such operations, where large volumes of fluids are pumped down into the oil well, it is commonly necessary to mix numerous additives or other materials with the primary fluid prior to pumping the same down into the oil well. This provides a need for storing numerous additive materials, both dry and liquid, and for accurately metering said materials at widely varying flow rates to a point where the additive materials are mixed with the primary fluid. The concentrations of the additives relative to the primary fluid volume also vary widely.

The prior art methods which have typically been used for adding these large volumes of additive materials to the primary fluid to be pumped down an oil well have typically been rather crude.

For example, for dry materials, those materials are typically stored in large sacks which are stacked on a flat bed truck. The dry material is transferred from the sacks to the blender tub where it is mixed with the primary fluid by manually cutting the sacks and dumping the contents thereof into a hopper which feeds into a volume controlled vane feeder which discharges into the blender. The rate at which the material is discharged is controlled by controlling the speed of the vane feeder.

The typical manner in which liquid materials have been stored in prior art systems is to store the liquid materials in barrels or cans. Then a pump is placed in an opening of the barrel or can to pump the liquid therefrom into the mixing tub of the blender. The liquid materials are sometimes initially dumped in a holding tank from which they are pumped into the mixing tub of the blender.

The prior art does include numerous automatically controlled metering systems for dry materials such as are shown in U.S. Pat. Nos. 4,111,336 to Ward, et al; 4,111,335 to Arya, et al; and 4,111,272 to Ricciardi, et al. None of those systems, however, appear to disclose a system similar to that of the present invention which provides the ability to simultaneously store and meter a great many both dry and liquid additives for use in oil well treatment operations.

The metering bins of the present invention, which are utilized for metering dry materials, are preferably a type of dry material metering bin which is generally referred to as a mass flow bin. Of relevance to the design of mass flow bins is Bulletin of the University of Utah, Volume 53, No. 26, Bulletin No. 123 (November 1964) entitled "Storage and Flow of Solids", by Andrew W. Jenike. That reference discloses numerous general concepts about the design of such mass flow bins, but does not specifically disclose the applicability of those concepts to the situation encountered in storing large volumes of dry materials and metering the same at very accurate rates for use in treatment of oil wells.

The present invention provides a trailer-mounted portable material storage and metering system having the ability to transport, store, meter and convey a plurality of liquid and dry additives for mixing with a primary fluid to be pumped down into an oil well. The system has the ability to provide the desirable concentrations and flow rate of typical materials used in a very large gell fracturing operation including on the order of 50,000 gallons of primary fluid, with bulk replenishment of the additives to the storage system during the job.

Typical categories of additives to be utilized in gell fracturing operations include gelling agents, pH control additives, complexing agents, friction reducing agents, fluid loss agents, gell breaking agents, biocide agents, and non-emulsifying agents. All of these agents may be provided in either dry or liquid form.

Metering rates range up to 160 pounds per minute for dry materials, and up to 60 gallons per minute for liquid materials, at primary fluid delivery rates on the order of 50 barrels per minute. Concentrations of the materials in the primary liquid may range up to 80 pounds per 1,000 gallons for dry materials and up to 30 gallons per 1,000 gallons for liquid materials.

The metering system includes a plurality of dry material storage bins and a plurality of liquid material storage tanks. The liquid material storage tanks include both larger and smaller tanks. Similarly, the dry material storage bins include both larger and smaller bins.

Each of the dry material storage bins and liquid material storage tanks include an individual metering means for transferring materials from the respective storage means at a controlled flow rate within a range of flow rates.

The range of flow rates for the metering means for the larger dry materials storage bin is a first range having a low end and a high end. The metering means for the smaller dry material storage bin has a second range of flow rates which also has a high end and a low end. The low end of the second range is lower than the low end of the first range, and the high end of the second range is between the low and high ends of the first range.

In this manner, the ranges of flow rates available from the larger and smaller dry material storage bins overlap so that a continuous range of dry material flow rates is available ranging from the low end of the range of the metering means of the small bins to the high end of the range of the metering means of the large bins.

The metering means for the smaller and larger liquid storage tanks are similarly constructed so as to have their ranges overlap providing a similar continuous range of controllable flow rates for liquid additives.

Several other improvements provided by the present invention include the manner of mounting the dry material storage bins and sensing the mass of material contained therein and transferred therefrom. Also provided is a very efficient and compact arrangement of these components on the transportable trailer frame.

Numerous features and advantages of the present invention will be readily apparent to those skilled in the art upon a reading of the following disclosure when taken in conjunction with the accompanying drawings.

FIG. 11 is a sectional view taken along line 11—11 of FIG. 8, showing a horizontal section through the flexible bellows of the metering system of one of the larger material storage bins.

FIG. 12 is a sectional view taken along line 12—12 of FIG. 8 showing a front elevation view of the dry material metering means for one of the larger dry material storage bins.

FIG. 13 is a view along line 13—13 of FIG. 9 showing a left side elevation view of the dry material metering means for one of the smaller dry material storage bins.

FIG. 18 is a schematic section view taken along line 18—18 of FIG. 14 showing a vertical cross section through the metering bin for the metering system of a large dry material storage bin.

Figure 1:
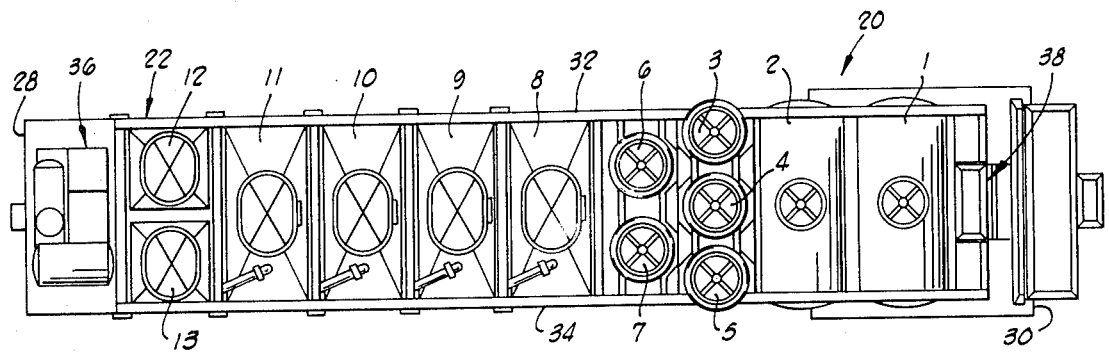
FIG. 1 is a plan view of the trailer mounted material storage and metering system of the present invention.
Figure 2:
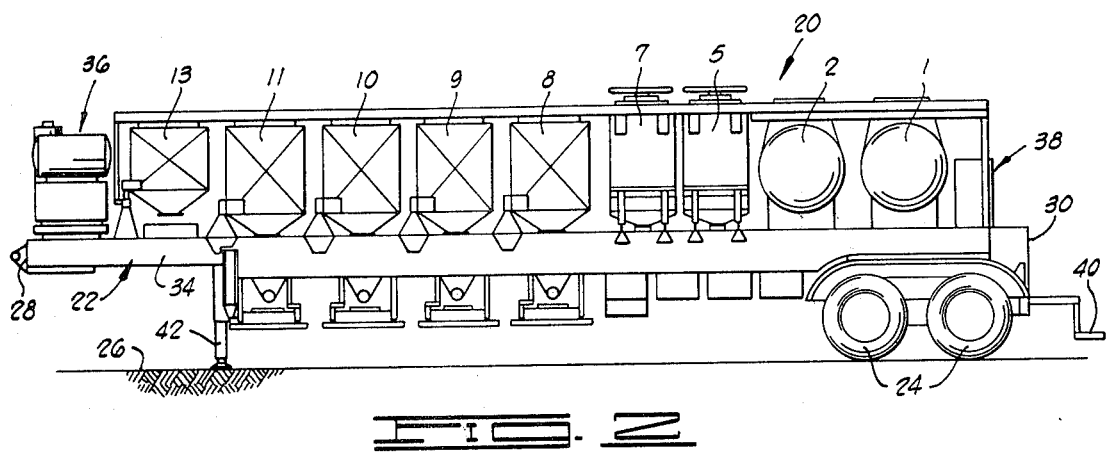
FIG. 2 is a left side elevation view of the system of FIG. 1.
Figure 3:
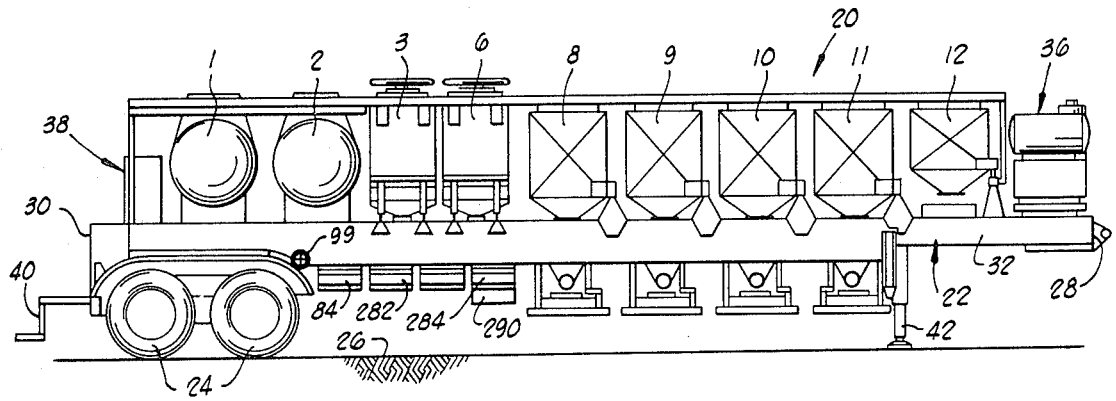
FIG. 3 is a right side elevation view of the system of FIG. 1.

Referring now to the drawings, and particularly to FIGS. 1-3, the material metering and storage system of the present invention is shown and generally designated by the numeral 20.

The system 20 includes a transportable trailer frame 22, having a plurality of wheels or other ground engaging means 24, for allowing the frame 22 to traverse a ground surface 26.

Mounted upon the frame 22 are thirteen additive material storage means indicated by the numerals 1 through 13.

The frame 22 is a rectangular frame having first and second opposed shorter sides 28 and 30, and having third and fourth opposed longer sides 32 and 34.

Material storage means 1 and 2 are larger liquid material storage tanks having a capacity of 500 gallons each. Larger liquid material storage tanks 1 and 2 are each horizontally oriented cylindrical tanks having a cylindrical axis thereof oriented substantially parallel to first and second sides 28 and 30 of frame 22 and having a cylindrical length approximately equal to the width of frame 22.

Material storage means 3, 4, 5, 6 and 7 are smaller liquid storage tanks having a capacity of 150 gallons. Smaller liquid storage tanks 3 through 7 are vertically oriented cylindrical tanks being arranged on frame 22 in two rows across the width of frame 22.

Storage means 8, 9, 10 and 11 are larger dry material storage bins having a capacity of seventy-five cubic feet each, which translates to about 2,000 pounds of typical dry material. Each of the larger dry material storage bins 8 through 11 have a substantially rectangular horizontal cross section with a length of said cross section being oriented substantially parallel to the first and second sides 28 and 30 of frame 22, and with a width of said cross section being oriented substantially parallel to third and fourth sides 32 and 34 of frame 22. The horizontal cross sectional length of larger dry material storage bins 8 through 11 is approximately equal to the width of frame 22.

Storage means 12 and 13 are smaller dry material storage bins having a capacity of twenty-five cubic feet. Smaller dry material storage bins 12 and 13 are arranged in a row across the width of frame 22.

The liquid material storage means 1 through 7 are all oriented on a rearward portion of frame 22. The dry material storage means 8 through 13 are all located on a forward portion of frame 22.

It will be understood with regard to the term "dry material", that such dry materials will generally have at least some moisture content. The term "dry material" as used herein, is used interchangeably with the term "solid phase materials" so as to refer to materials that are not liquid or gaseous materials. These dry or solid phase materials are generally provided in a granulated or powdered form.

Located near the forward end 28 of trailer 22 is a self-contained power system 36 for providing power to the various hydraulic and electrically powered components of the storage and metering system 20.

Located at the rearward end 30 of trailer frame 22 is a control station means 38 for controlling the storage and metering system 20.

A folding step 40 at the rearward end of trailer 22 provides an access means so that an operator may approach and operate the control station 38.

Near the front end of trailer 22 is a support jack 42 for supporting the trailer when it is not being transported. When it is desired to transport the trailer 22, the front end 28 thereof is attached to a conventional tractor.

Located above the various storage means of the system 20 is a walkway and work platform which is not shown in these illustrations, so that the various other components may be more clearly illustrated.

Figure 4:
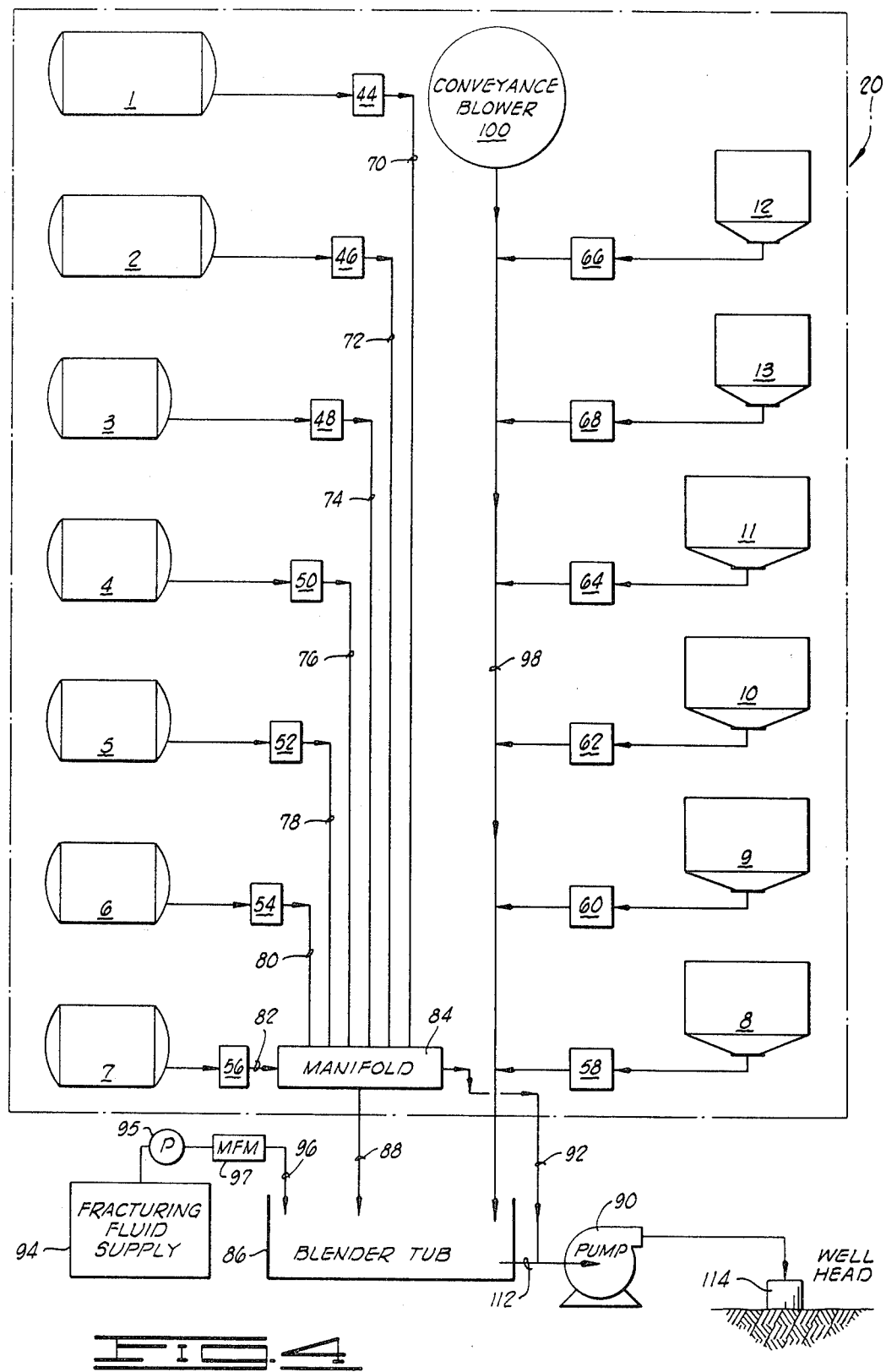
FIG. 4 is a schematic illustration of the system of FIG. 1 illustrating the various storage means and discharge systems as connected to the other components for mixing the additives with the rimary fluid which is pumped down into the oil well.

Referring now to FIG. 4, the storage and metering system 20 is there schematically illustrated to show the manner in which the material discharge conduits from the various storage means 1 through 13 are interconnected together and with the other equipment necessary for mixing the materials with a primary fluid for pumping into an oil well.

Connected to liquid storage tanks 1, 2, 3, 4, 5, 6 and 7 are liquid material metering means 44, 46, 48, 50, 52, 54 and 56, respectively, for transferring liquid materials from their respective liquid storage tanks. Connected to dry material storage bins 8, 9, 10, 11, 12 and 13 are dry material metering means 58, 60, 62, 64, 66 and 68, respectively, for metering materials from their respective dry material storage bins.

The metering systems 44 through 56 of the liquid storage tanks 1 through 7 are connected by liquid discharge conduits 70, 72, 74, 76, 78, 80 and 82, respectively, to a series of valving generally represented by manifold 84.

By appropriate adjustment of manifolding 84, the discharge from each of the discharge conduits 70 through 82 may be independently directed either directly into a blender tube 86 as represented by conduit 88 or may be bypassed around blender tube 86 and added directly at the suction of pump 90 as indicated by conduit 92.

In the blender tub 86 the various materials from storage and metering system 20 are mixed with a primary fluid, such as water, provided by fracturing fluid supply 94 by means of conduit 96. Located in the conduit 96 is a pump 95 and a main flowmeter (MFM) 97 for converting the discharge rate of the primary fluid into a proportional electrical signal. It is to be noted that this main flowmeter 97 could be positioned elsewhere, such as the outlet of the pump 90. In such a position the generated electrical signal would be proportional to the flow rate of the combined additive and primary substance mixture.

It is sometimes desirable to direct some of the liquid additives directly to the suction pump 90 through conduit 92 in order to prevent premature mixing of certain incompatible additives which have a reaction, one to the other.

The discharge from each of the dry material metering means 58 through 68 is connected to a single dry material discharge conduit 98. A conveyance blower 100 supplies a conveying fluid, preferably air, to dry material discharge conduit 98 and said conveying fluid carries the dry material along therewith through discharge conduit 98 to blender tub 86.

The dry material discharge line 98 includes an integral portion mounted on the trailer frame 22 which includes an end 99, as shown in FIG. 3. The remainder of conduit 98 between end 99 and blender tub 86 is comprised of any suitable conduit connected therebetween.

After the various liquid and dry additives are mixed with the primary fluid in the blender tub 86, the entire mixture is taken from blender tub 86 by a suction line 112 of pump 90 and is discharged from pump 90 at a high pressure into well head 114 of a well.

The liquid material metering systems 44 and 46 for transferring liquid materials from the larger liquid strage tanks 1 and 2 are constructed to have generally higher flow rate capacities than are the liquid material metering systems 48 through 56 of smaller liquid storage tanks 3 through 7. The range of flow rates which may be provided by the liquid metering systems 44 and 46 for the larger storage tanks 1 and 2, overlaps with the somewhat lower range of flow rates which may be provided by metering systems 48 through 56 of smaller liquid storage tanks 3 through 7.

More specifically, liquid metering systems 44 and 46 have an operating range varying from a low end of 5.0 gallons per minute to a high end of 60 gallons per minute. Metering systems 48 through 56 have an operating range varying from a low end of 0.70 to 12 gallons per minute. Of course, each of the metering systems operates best at some intermediate point within its specified operating range.

In this manner, for a given liquid material, any flow rate can be provided within an overall range from 0.70 to 60 gallons per minute by placing the specific liquid material in the appropriate storage tank. Similarly, due to the fact that these materials are added to a flowing primary fluid stream, the liquid metering systems 44 and 46 with the high potential flow rates may provide higher concentrations of additives to the primary liquid stream than can the lower capacity metering systems 48 through 56.

Metering systems 44 and 46 can provide liquid concentrations in the range from 0.1 to 30 gallons of additive per 1,000 gallons of primary fluid being injected into the oil well 114. The smaller metering systems 48 through 56 can provide a liquid concentration within a range of 0.02 to 8 gallons of additive per 1,000 gallons of primary fluid.

Similarly, the dry material metering systems 58 through 64 of larger dry material storage bins 8 through 11 have a larger capacity and a generally overall higher operating capacity range than the dry material metering systems 66 and 68 for smaller dry material storage bins 12 and 13.

Metering systems 58 through 64 can provide dry materials at a flow rate within a range varying from 10 to 160 pounds per minute. These additives may be provided at dry concentrations from 10 to 80 pounds of additive per 1,000 gallons of primary fluid.

Similarly, metering systems 66 and 68 for smaller dry material storage bins 12 and 13 can provide dry material flow rate within a range from 4 to 30 pounds per minute at concentrations ranging from 1 to 30 pounds of additive per 1,000 gallons of primary fluid.

Figure 5:
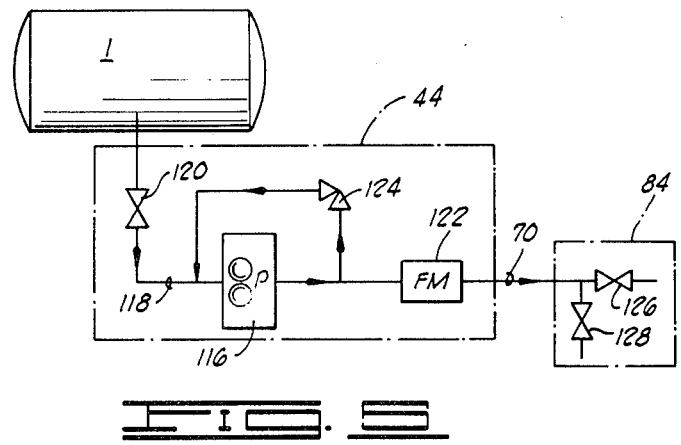
FIG. 5 is a schematic representation of a typical liquid tank discharge system.

Referring now to FIG. 5, a typical schematic illustration is shown at one of the liquid storage tanks with its respective liquid metering system as connected to a portion of the manifold 84. For convenience of illustration, FIG. 5 will be described with respect to large liquid storage tank 1 and its associated metering equipment.

The liquid material metering system 44 includes a hydraulically powered positive displacement type liquid pump 116. Pump 116 is connected to storage tank 1 by a suction line 118 in which is disposed a safety shut-off valve 120. The discharge of pump 116 is connected of liquid material discharge line 70. Disposed in discharge line 70 is a flow meter 122 which is preferably a turbine type flow meter.

A safety relief valve 124 is provided for allowing discharge line 70 to be bypassed back to suction line 118 in the event discharge line 70 should be shut in or otherwise allowed to over pressure, thereby preventing the equipment from being damaged by excess pressure generated by positive displacement pump 116.

Connected to discharge line 70 are two valves 126 and 128 which form a portion of manifold 84. Each of the discharge lines 70 through 82 has a pair of valves similar to valves 126 and 128 attached thereto, and they are arranged physically adjacent each other to form the manifold 84 which is attached to trailer frame 22 in the location shown schematically in FIG. 3.

By means of the manifold 84 each one of the discharge lines 70 through 82 may be individually connected to the blender tub 86 or to the suction line 112 of pump 90 as seen in FIG. 4 by a suitable conduit. Similarly, any combination of the discharge conduits 70 through 82 may be connected together by a series of short bypass lines connecting downward directing valves such as valve 128 together so as to provide a convenient means for connecting the discharge from the various liquid tanks. Then, the combined discharge from the desired liquid tanks may be directed by a single conduit 88 to the blender tub 86 or by a single conduit 92 to the suction line 112.

Figure 6:
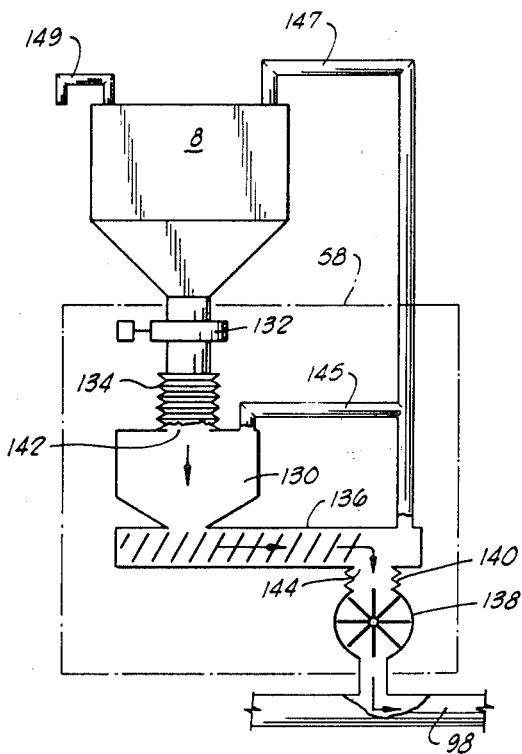
FIG. 6 is a schematic representation of a typical dry material discharge system.

Referring now to FIG. 6, a schematic illustration is thereshown of one of the dry material storage bins with its associated dry material metering means as connected to the dry material discharge conduit 98. For purposes of convenient illustration, the typical system shown in FIG. 6 will be described with relation to the specific components of larger dry material storage bin 8.

The dry material metering sytem 58 comprises a two bin system with the first bin being the storage bin 8 which may also be referred to as an inventory bin 8, and the second bin being a metering bin 130 which is smaller than the inventory bin 8. Each of the storage bin and metering bin may generally be referred to as a container means. The metering bin 130 has a capacity of 6 cubic feet. The analogous metering bin for one of the smaller storage bins has a capacity of 2 cubic feet.

The metering bin 130 provides a means for receiving dry material from the storage bin 8. Appropriate sensing devices, which are described in more detail below, sense the weights of storage bin 8 and metering bin 130, so that when the amount of material in metering bin 130 reaches a predetermined low level, the sensing means sends a signal to a hydraulically operated butterfly valve 132 which then opens to dump more material from storage bin 8 into metering bin 130. When the metering bin 130 is full, the sensing means sends a signal to the butterfly valve 132 to close the same. Metering bin 130 is connected to storage bin 8 by a first flexible connecting means 134, which is preferably constructed as a flexible bellows 134.

A screw conveyor means 136, which may also be referred to as a vane feeder, is disposed in the bottom of metering bin 130 for discharging dry material from metering bin 130 at a controlled rate within the range of flow rates described above for dry material metering system 58.

The screw conveyor 136 is connected to dry material discharge conduit 98 through an air lock means 138 which provides a means for allowing passage of material therethrough while preventing an internal pressure within discharge conduit 98 from being communicated to screw conveyor 136.

The screw conveyor means 136 is connected to air lock 138 by a second flexible connecting means 140 which is preferably a flexible bellows 140. Flexible bellows 140 may also be said to connect screw conveyor 136 to discharge line 98.

The air lock means 138 as used with larger dry material storage bins 8 through 11 is a blow through type air lock which is described in more detail below with reference to the detailed illustrations of the air locks. The air locks used with smaller dry material storage bins 12 and 13 and their respective metering systems 66 and 68 are preferably drop through type air locks which are also described in more detail below.

An area of an upward facing opening 142 in metering bin 130 communicating with storage bin 8 through valve 132 is substantially equal to an area of a downward facing opening 144 in screw conveyor means 136 communiated with second flexible bellows 140. Openings 142 and 144 are more clearly shown in FIGS. 18 and 11, respectively. A vent means 145 communicates a discharge end of conveyor means 136 with an upper portion of metering bin means 130 so that internal pressures within metering bin 130 and first conveyor means 136 as communicated to openings 142 and 144 are substantially equalized. In this manner, the forces acting on metering bin means 130 and screw conveyor means 136 due to internal pressures are balanced so that they do not affect the weight of metering bin means 130 and screw conveyor means 136 as weighed by a weight sensing means which is described below.

An extension 147 of vent line 145 communicates with storage bin 8, so that dust is contained within the system. A storage bin vent 149 is also provided.

Figures 14, 15:
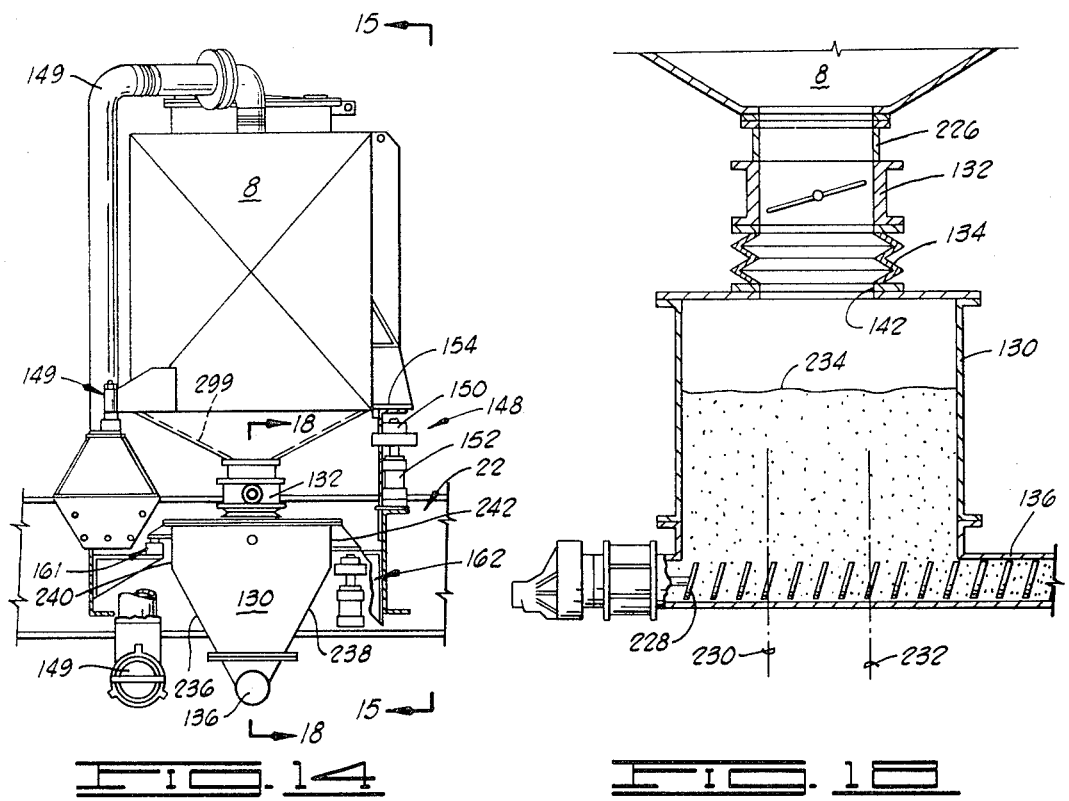
FIG. 14 is a left side elevation view of a single one of the larger dry material storage bins, particularly illustrating the manner in which the storage bin is mounted upon the trailer frame.
FIG. 15 is a rear elevation view of the larger dry material storage bin of FIG. 14, taken about line 15—15.
Figure 19:
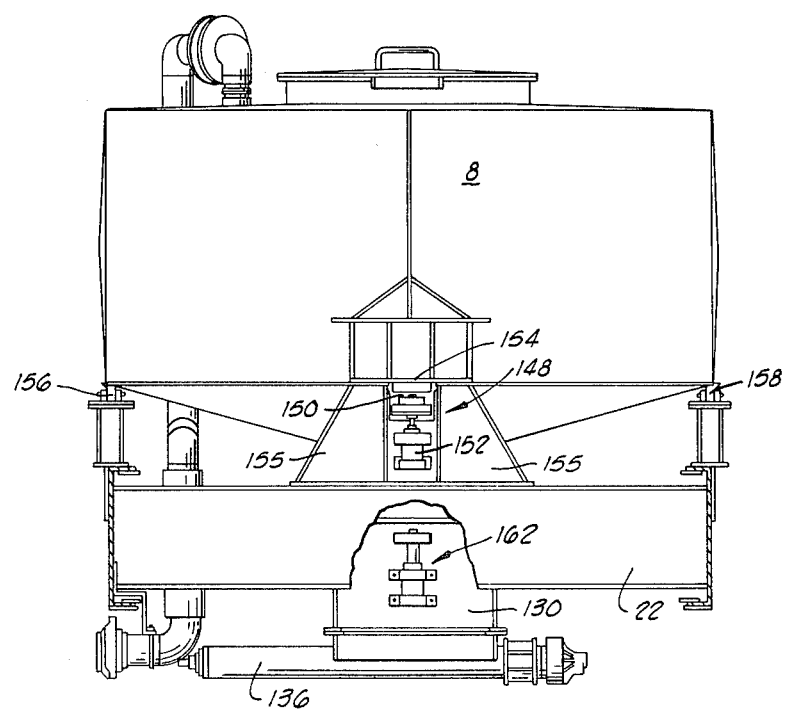

Referring now to FIG. 14, a left side elevation view is shown of dry material storage bin 8 and metering bin 130 as attached to trailer frame 22. A bulk replenishment line 149 is visible in FIG. 14, and provides a means for replenishing the dry material in bin 8.

Storage means 8 is supported from frame 22 by a first support means 146 and a load call support means 148.

Load cell support means 148 includes a sensing element 150 for sensing a weight supported by load cell means 148 and for generating a signal representing said weight. A hydraulic cylinder lift means 152 of load cell support means 148 is movable between a first position (not shown) wherein sensing element 150 of load cell support means 148 is held in load supporting engagement with a horizontally extending support bracket 154 of storage bin 8, and a second position, as shown, wherein sensing element 150 of load cell support means 148 is held out of load supporting engagement with support bracket 154 of storage bin 8.

The first support means 146 includes left and right supporting mounts 156 and 158, as best seen in FIG. 15. Mounts 156 and 158 of first support means 146 may be pin mounts or ball and socket mounts, but preferably are constructed so as to provide a means for providing at least one degree of freedom of movement, in kinematic terms, between storage bin 8 and frame 22. The ball and socket joint, of course, provides three degrees of freedom of movement.

This flexible mounting provided by first support means 146 is desirable because of the fact that the trailer frame 22 may be transported over rough terrain, and also because of the need for movement of the bins upon engagement therewith of the load cell support means.

First support means 146 and load cell support means 148 are symmetrically located on opposite sides of a vertical plane disposed centrally through storage bin 8 and extending perpendicularly out of the plane on which FIG. 14 is drawn. In that manner, assuming that storage bin 8 is evenly loaded, one half the weight of storage bin 8 and its content is supported by first support means 146 and one-half the weight of the storage bin 8 and its contents is supported by load cell support means 148.

The purpose of the hydraulic cylinder lift means 152 is to allow the load cell support means 148 to be disengaged from the storage bin 8 when the trailer frame 22 is being moved. This prevents damage to the sensing element or load cell 150. When cylinder 152 is retracted the support bracket 154 of bin 8 rests on a frame member 155 of frame 22 which may be referred to as a transportation mode support means 155.

Similarly, metering bin 130 is supported from trailer frame 22 by a first support means 160 and a load cell support means 162 having a sensing element.

Figure 16:
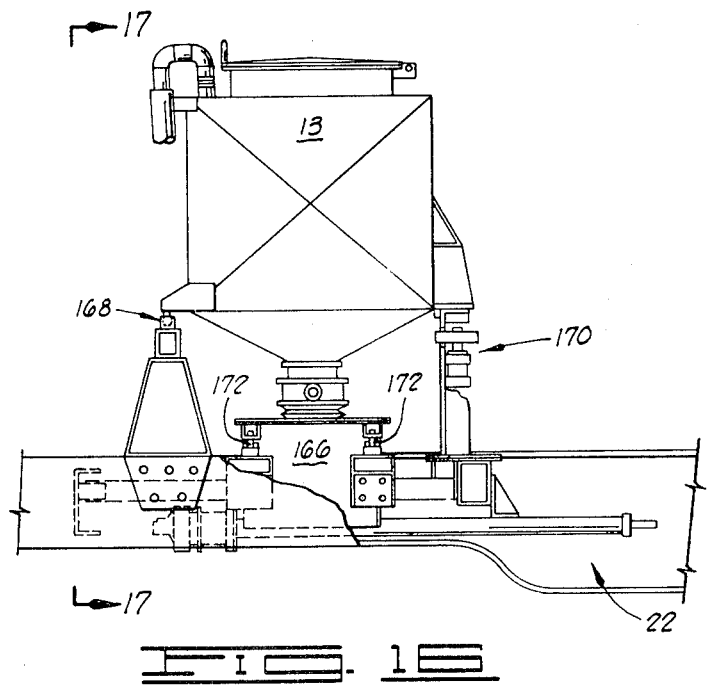
FIG. 16 is a left side elevation view of one of the smaller dry material storage bins, particularly showing the manner of mounting the storage bin upon the trailer frame.
Figure 17:
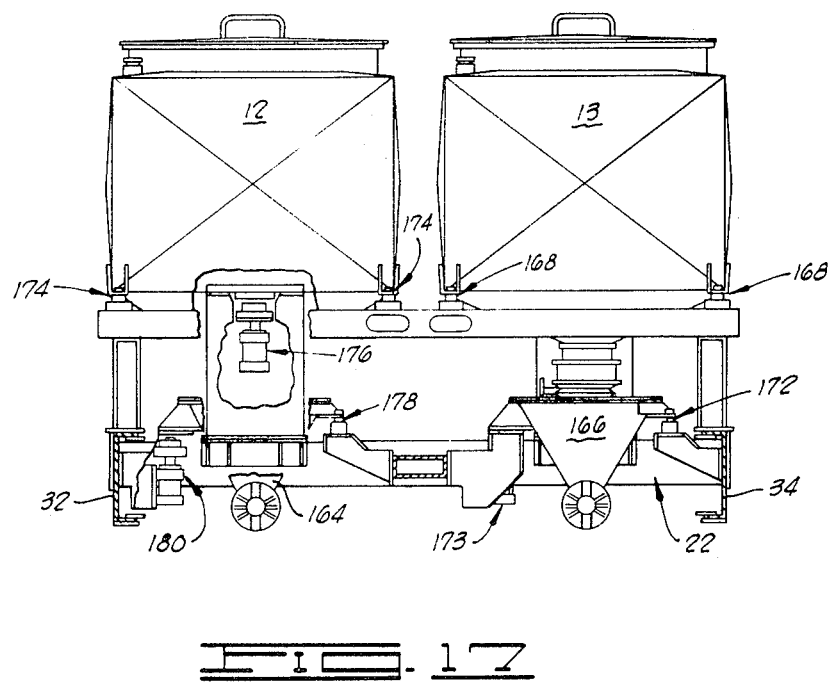
FIG. 17 is a front elevation showing the two smaller dry material storage bins of FIG. 16, taken about line 17—17.

Referring now to FIGS. 16 and 17, similar illustrations are shown of the mounting of the smaller dry material storage bins 12 and 13 and their associated dry material metering systems.

Disposed below storage bin 12 is its associated metering bin 164, and disposed below storage bin 13 is its associated metering bin 166.

Metering bin 13 is shown in the left side elevation view of FIG. 16 and it is seen to be supported from trailer frame 22 by a first support means 168 and a load cell support means 170. Metering bin 166 is supported from trailer frame 22 by first support means 172 and a load cell support means 173 (See FIG. 17).

As is seen in FIG. 17, storage bin 12 is supported from frame 22 by a first support means 174 and a load cell support means 176, which is located on the rear side of the bin and illustrated in FIG. 17 by cutting away the supporting structural members in front of load cell support means 176.

The metering bin 164 for storage bin 12 is supported from frame 22 by a first support means 178 and a load cell support means 180.

The load cell support means for the storage bins 8 through 13 preferably include electric load cells as sensing elements and the load cell support means for the metering bins preferably include hydraulic load cells as the respective sensing elements.

Referring now to FIGS. 8 through 13, some details of the construction of the dry material metering systems for bins 8 through 13 are thereshown.

Figure 8:
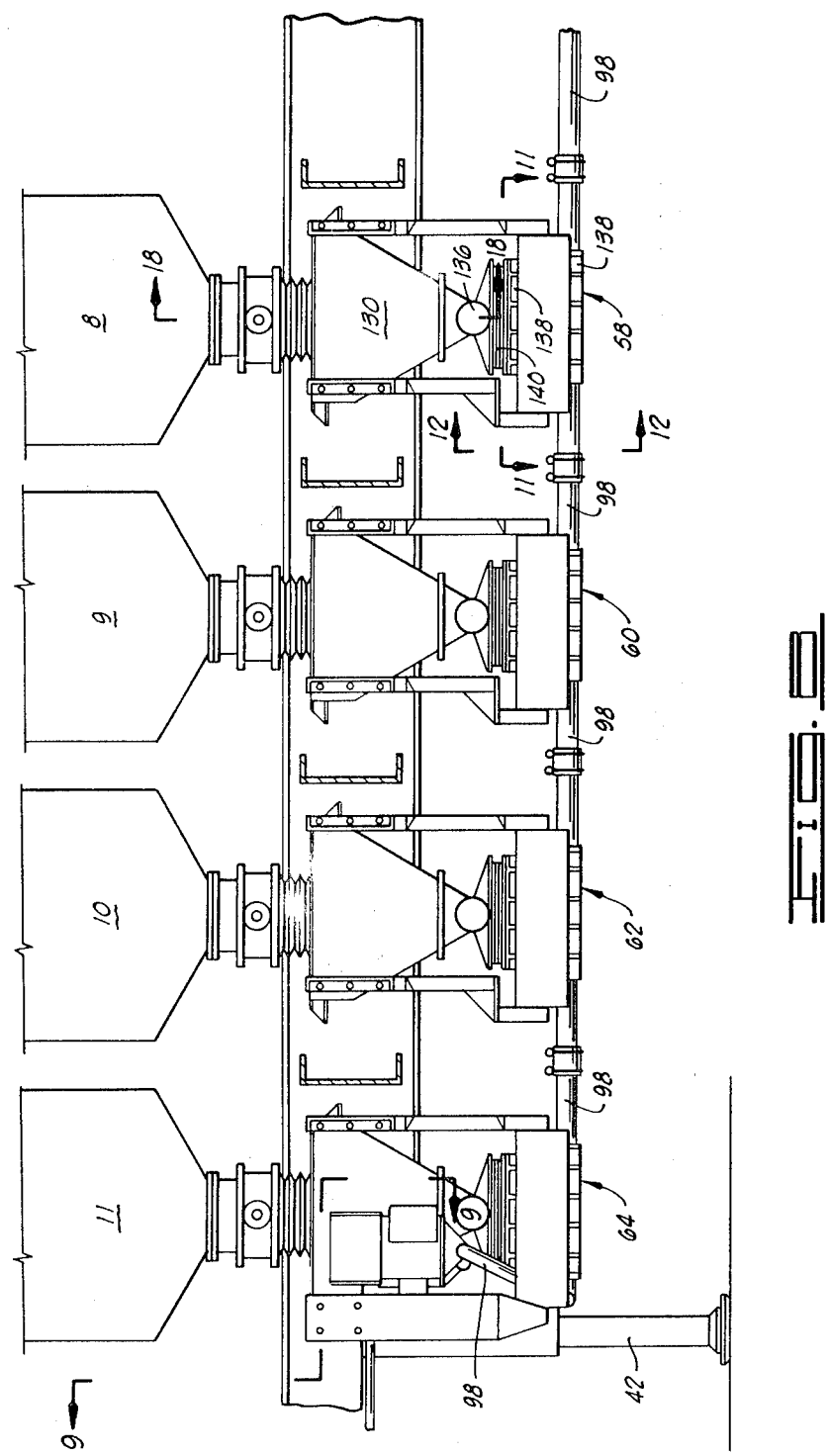
FIG. 8 is an enlarged left side elevation view of the dry material metering system for the four large dry material storage bins.

As is shown in FIG. 8, the blow through type air locks, such as air lock 138 of dry material metering means 58 for storage bin 8, are aligned with discharge conduit 98 so that the blow through type air locks in fact form a portion of discharge conduit 98. The blow through type air locks are therefore connected in series within dry material discharge conduit 98.

More of the details of dry material metering means 58 are shown in FIGS. 11 and 12 as taken about lines 11—11 and 12—12, respectively, of FIG. 8.

FIG. 11 is a horizontal section view through the flexible bellows 140 connected between screw conveyor 136 and blow through air lock 138. The air lock 138 is a rotating vane type air lock which functions in a manner similar to a revolving door, and which is rotated by a hydraulic air lock driving motor 182 as connected to the rotating vane by drive belt 184. Belt 184 drives a pulley 185 on air lock shaft 186. Belt 184 and pulley 185 may be replaced by a chain and sprocket. A plurality of vanes 188 extend from shaft 186.

The discharge conduit 98 is offset below the central axis of air lock shaft 186, so that the rotating vanes of air lock 138 prevent pressure within discharge conduit 98 from being communicated with screw conveyor 136.

The discharge conduit 98 blows between the rotating vanes 188 as they traverse the lower portion of their rotating path. This clears the dry material from between the vanes.

Figure 9:
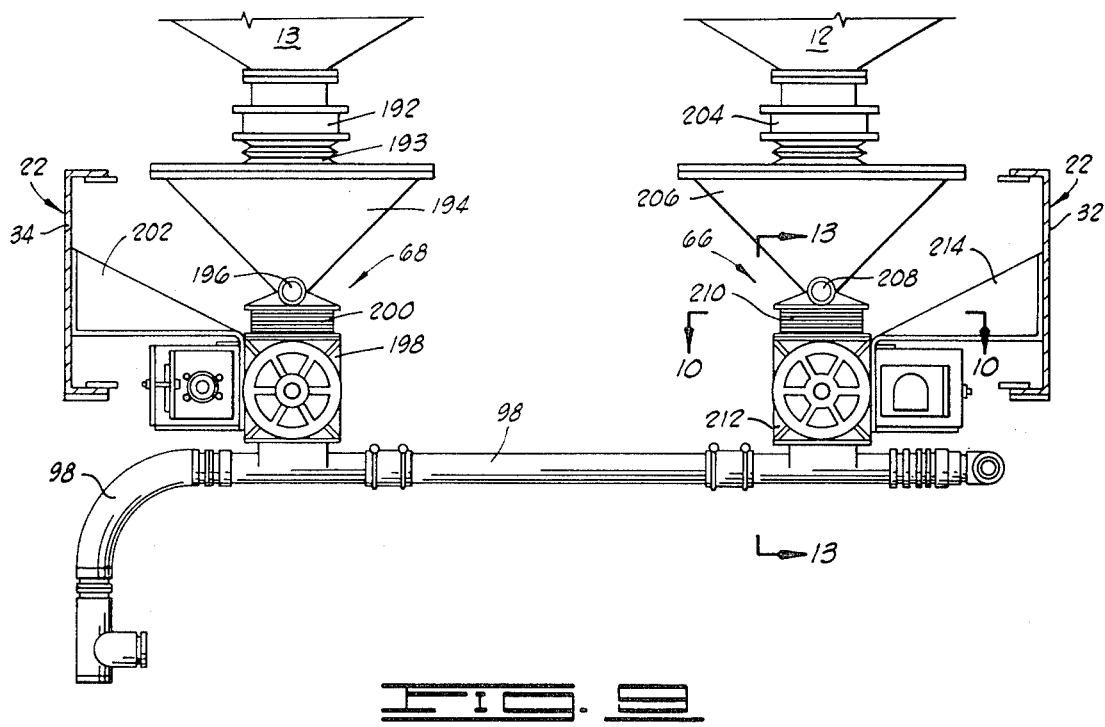
FIG. 9 is a rear elevation view of the dry material metering system for the two smaller dry material storage bins as taken along line 9—9 of FIG. 8.
Figure 10:
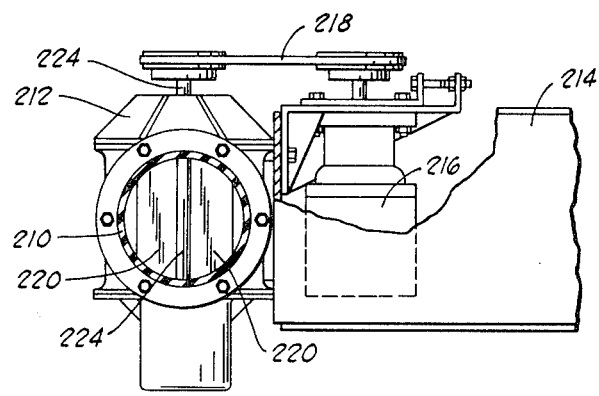
FIG. 10 is a sectional view taken along line 10—10 of FIG. 9 showing a horizontal section through the flexible bellows of the dry material discharge system for one of the small dry material bins.

Referring now to FIGS. 9, 10 and 13, various details of the dry material metering sytems for smaller dry material storage bins 12 and 13 are thereshown.

FIG. 9 is a rear elevation view taken along line 9—9 of FIG. 8. The metering systems 66 and 68 for smaller dry material storage bins 12 and 13 are illustrated.

Metering system 68 for smaller dry material storage bin 13 includes a hydraulically operated butterfly valve 192 connected between storage bin 13 and a flexible bellows 193 connecting butterfly valve 192 to smaller dry material metering bin 194.

Disposed in the lower portion of metering bin 194 is a screw conveyor 196. Connecting a discharge end of screw conveyor 196 to a drop through type air lock 198 is a flexible bellows 200. The lower discharge end of drop through air lock 198 is connected to dry material discharge conduit 98.

As is shown in FIG. 9, the drop through air lock 198 is attached to trailer frame 22 by a mounting bracket 202.

Metering system 66 of smaller dry material storage bin 12 is similarly constructed, having a butterfly valve 204, metering bin 206, conveyor 208, flexible bellows 210, drop through air lock 212 and mounting bracket 214.

A horizontal sectional view is taken along line 10—10 through flexible bellows 210 of metering system 66 for smaller dry material storage bin.

Shown in FIG. 10 are the drop through type air lock 212, and its associated drive motor 216 and drive belt 218. Belt 218 and its associated pulleys may be replaced by a chain and sprockets. The drop through type air lock is similar to the blow through type air lock previously described in that it includes a plurality of radially spaced rotating vanes which convey material from the bellows 210 to the discharge conduit 98 while preventing pressure from within conduit 98 from being communicated to bellows 210.

The drop through type air lock 212, however, differs from the previously described blow through type air lock in that the drop through type air lock does not place the vanes directly in the path of the discharge conduit 98, but rather places them above discharge conduit 98 so that the dry material falls downward from between the vanes as the vanes traverse the downwardmost portion of their arc directly above discharge conduit 98.

Two vanes 220 and 222 of drop through air lock 212 can be seen in FIG. 10 extending radially outward from air lock shaft 224.

A left side elevation view of drop through air lock 212 as connected between discharge conveyor 208 and discharge conduit 98 is shown in FIG. 13. That is a view about line 13—13 of FIG. 9.

Referring now to FIG. 18, a vertical sectional view along line 18—18 of FIG. 8 is taken through metering bin 130 schematically showing its connection to the conveyor 136 and to the storage bin 8.

The flexible bellows 134 is attached to the top of metering bin 130 and the butterfly valve 132 is connected thereto. A short extension member 226 connects butterfly valve 132 to storage bin 8.

As can be seen in FIG. 18, the conveyor means 136 has a varying pitch along the length of screw 228.

The bin 130 is divided into thirds along imaginary lines 230 and 232, and at lines 230 and 232 the pitch of the screw 228 changes. The screw has its smallest pitch to the left of line 230, as seen in FIG. 18. Between lines 230 and 232, the pitch is increased so that that portion of screw 228 can carry more material than can the portion to the left of line 230. The portion of screw 228 to the right of line 232 has the greatest pitch and in turn, can carry even more material than that portion of the screw between lines 230 and 232. The pitch is increased in an amount sufficient to permit the screw 228 to carry all of the material which has entered the screw to the left of any given point on the screw, plus additional material falling into the screw from directly above, so that the material within bin 130 is evenly drawn out of the bottom of the bin 130, maintaining an approximately level upper surface 234 of the material in bin 130.

Metering bin 130 is preferably a mass flow bin. The term "mass flow" indicates that whenever the conveyor 136 is set in motion, all of the material within bin 130 flows, and there are no inactive or dead regions of flow within the bin. Mass flow bins typically are characterized by steep hopper sides and by the absence of sharp transition points along the inner surface of the bin.

One such type of mass flow bin is known as a "chisel hopper" which typically has two steep tapered sides, 236 and 238 as seen in FIG. 14 which converge along the length of the screw conveyor. Parallel vertical sides 240 and 242 are also included in metering bin 130 to increase the capacity thereof.

As can be seen in FIG. 9, the smaller metering bins 194 annd 206 for smaller dry material storage bins 13 and 12, respectively, are also chisel bins in that they have the two tapered sides similar to sides 236 and 238, but those smaller bins 194 and 206 do not have the parallel vertical sides at the top thereof.

Figure 7:
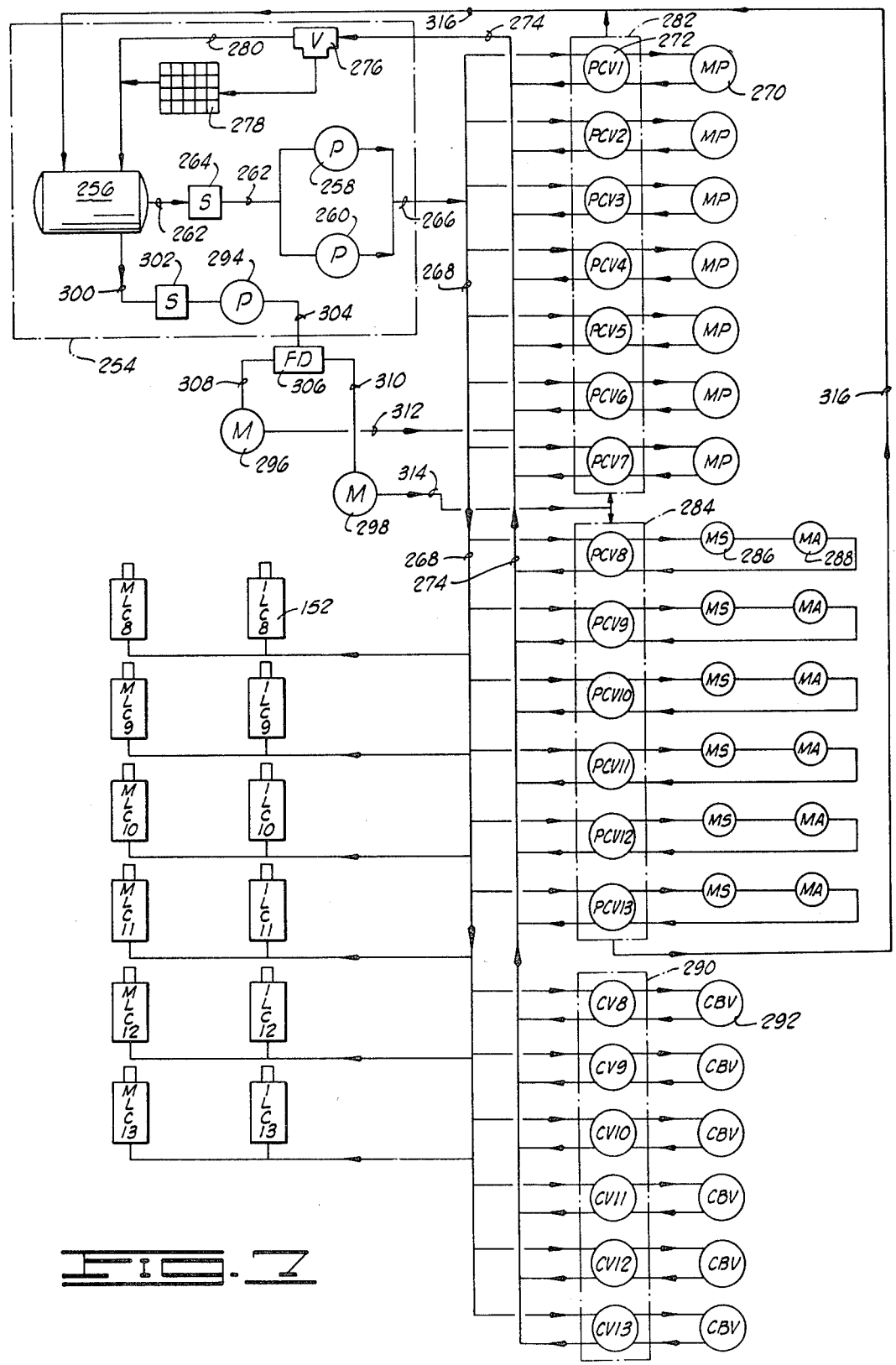
FIG. 7 is a schematic representation of the hydraulic power system which operates the various components of the system of FIG. 1.

Referring now to FIG. 7, a hydraulic schematic illustration is thereshown of the hydraulic power system connecting the various components of the system 20.

A portion of the self-contained power system 36 shown in FIGS. 1–3 is a hydraulic power supply source which is schematically illustrated in FIG. 7 and generally indicated by the numeral 254.

Hydraulic power supply 254 includes a hydraulic fluid storage sump 256. First and second main hydraulic supply pumps 258 and 260 take hydraulic fluid from source 256 through a common suction line 262. A conventional strainer 264 is disposed in such suction line 262. A common discharge line 266 from pumps 258 and 260 connects them to a main hydraulic supply conduit 268.

As previously described with relation to FIG. 5, the liquid storage tanks 1 through 7 have liquid metering systems 44 through 56, respectively, each of which includes a positive displacement pump such as pump 116 of metering system 44 for liquid storage tank 1. Each of the pumps like pump 116 is a hydraulically driven pump, and therefore includes a hydraulically powered pump motor. The pump motor for pump 116 of storage tank 1 is indicated in the upper right hand corner of FIG. 7 by the numeral 270. The flow of hydraulic power fluid to pump motor 270 is controlled by an electric over hydraulic proportional control valve 272. Proportional control valve 272 receives hydraulic fluid under pressure from the main hydraulic supply conduit 268 and then returns hydraulic fluid to a main hydraulic return line 274.

The fluid from return line 274 goes through a thermostatically controlled valve 276 which, depending upon the temperature of the return fluid, either directs it through a cooling radiator 278 or bypass radiator 278 by bypass line 280, and by either means returns the fluid to sump 256.

Returning now to the description of the hydraulically powered pumps, such as pump 116 of FIG. 5, attention is once again directed to the upper right hand corner of FIG. 7. There seven proportional control valves for controlling the hydraulic pump motors of the positive displacement pumps of metering systems 44 through 56 of liquid tanks 1 through 7, respectively, are shown and indicated by the labeling PCV1 through PCV7, respectively. The proportional control valve 272, which is labeled PCV1, indicates the proportional control valve for tank 1. Similarly, the proportional control valve labeled PCV2 indicates the proportional control valve for the hydraulic pump motor of liquid tank 2.

Proportional control valves PCV1 through PCV7 are physically arranged adjacent each other in a bank of control valves generally designated by the numeral 282, the physical position of which is schematically illustrated in FIG. 3. Each of the proportional control valves PCV1 through PCV7 may be either operated manually or by an automatic control system.

As was previously described with regard to FIG. 6, each of the dry material metering systems 58 through 68 includes a screw conveyor such as screw conveyor 136 and an air lock such as air lock 138. Screw conveyor 136 and air lock 138 each are hydraulically powered and therefore include a hydraulic motor for driving the same.

Referring now to the middle right hand portion of FIG. 7, a second bank of proportional control valves 284 is labeled PCV8 through PCV13. PCV8 controls the flow of hydraulic fluid under pressure to a hydraulic motor 286 for screw conveyor 136 and a hydraulic motor 288 for air lock 138. The hydraulic motors for the screw conveyors are designated by the labels MS, and the hydraulic motors for the air locks are designated by the labels MA.

It is noted that the hydraulic motor for the screw conveyor and for the air lock of each respective dry material metering system are connected in series so that hydraulic fluid is always simultaneously directed to the two power motors. In this manner, neither the screw conveyor 136 nor the air lock 138 may be operated without operating the other. This feature, in combination with a capacity of the air lock 138 being greater than a capacity of screw conveyor 136, prevents screw conveyor 136 from ever being blocked in so that it has no place to discharge the dry material carried thereby.

The physical location of second valve bank 284 is shown in FIG. 3.

Referring now to the bottom right hand portion of FIG. 7, a third bank of control valves designated generally by the numeral 290 includes control valves CV8 through CV13.

As previously indicated with regard to FIG. 6, each of the dry material metering systems such as system 58 includes a hydraulically powered butterfly valve, such as valve 132, between the metering bin and the storage bin 8. Each of the butterfly valves such as butterfly valve 132 includes a hydraulic cylinder such as hydraulic cylinder 292 for butterfly valve 132. The hydraulic cylinder 292 for butterfly valve 132 is labeled with the designation CBV which indicates a hydraulic cylinder for a butterfly valve. The designation CV8 indicates the control valve for the hydraulic cylinder 292 of butterfly valve 132 of tank 8.

The physical location of third bank of control valves 290, including control valves CV8 through CV13, is indicated in FIG. 3 as being directly below the location of second bank 284.

As previously described with regard to FIGS. 14-17, each of the dry material storage bins 8 through 13 and each of the metering bins contained in the dry material metering systems 58 through 68 includes a load cell supporting means which itself includes a hydraulic cylinder adapted to be extended upon the application of hydraulic pressure thereto, so as to move the load cell into load supporting engagement with its respective storage bin or metering bin.

For example, referring to FIG. 14, the load cell supporting means 148 for dry material storage bin 8 includes a hydraulic cylinder 152.

Referring now to the lower left hand portion of FIG. 7, a series of hydraulic cylinders are there illustrated. The hydraulic cylinders for the load cell support means of each of the inventory or storage bins 8 through 13 are labeled ILC8 through ILC13. The hydraulic cylinder 152 for the load cell support means for inventory bin 8 has been also indicated by the numeral 152 in FIG. 7 by way of illustration.

Similarly, the hydraulic cylinders for the load cell support means of the metering bins, such as metering bin 130, for each of the dry material metering systems 58 through 68 of dry material storage bins 8 through 13 are indicated by the labels MLC8 through ILC13.

As is shown in FIG. 7, each of the hydraulic cylinders for metering bin load cell support means MLC8 through MLC13 and for inventory bin load support means ILC8 through ILC13 are connected to main hydraulic supply conduit 268 so that when hydraulic fluid under pressure is supplied to main hydraulic supply conduit 268 thereby providing hydraulic power to the various hydraulic motors shown on the right hand side of FIG. 7, hydraulic pressure is also supplied to the hydraulic cylinders of each of the load cell support means so as to extend the hydraulic cylinders and move each of the load cell support means into load supporting engagement with its respective bin.

Referring again to the hydraulic power supply 254 in the upper left hand corner of FIG. 7, hydraulic power supply 254 includes a third power pump 294 for supplying hydraulic fluid under pressure to a motor 296 for powering conveyance blower 100 and to a motor 298 for powering an aeration blower (not shown).

The aeration blower driven by motor 298 provides compressed air to an aeration means in each of the dry material storage bins 8 through 13 for assisting the flow of the dry materials within the bins. Aeration means 299 of storage bin 8, see FIG. 14, is preferably a canvas type liner inside the lower tapered walls of the bin. The canvas liner is inflated with air from the aeration blower. The pressurized air slowly flows through the canvas liner into the dry material and tends to fluidize the dry material so that it readily flows out the bottom of bin 8.

The third supply pump 294 takes suction from hydraulic sump 256 through a suction line 300. A strainer 302 is disposed in suction line 300. A discharge line 304 connects the discharge of pump 294 to a flow divider 306 which splits the discharge from pump 294 and directs it through conduits 308 and 310 to the motors 296 and 298, respectively, for the conveyance blower and the aeration blower. The return fluid from motor 296 is directed to main hydraulic return line 274 through a conduit 312.

The valves of the first and second banks, 282 and 284, of proportional control valves are spool type valves which operate under pilot pressure. The return fluid from motor 298 is directed through pilot pressure supply line 314 to valve banks 282 and 284. The pilot fluid is returned to sump 256 by a pilot fluid return line 316.

A conventional flow controller (not shown) may be used ahead of each of the hydraulic motors shown in FIG. 7 to prevent damage to those motors. Also, conventional pressure relief valves (not shown) are desirably placed in conduits 266, 304, 308, 310 and 314.

While the various components of the storage and metering system 20 can be controlled and operated manually or by any number of automatic control systems, the system 20 disclosed herein is preferably utilized in conjunction with a microprocessor based automatic control system such as that disclosed and claimed in a patent application entitled "Additive Metering Control System" of Harvard L. Tomlinson and Stephen F. Crain, filed concurrently herewith and assigned to the assignee of the present invention.

Thus, it is seen that the additive material storage and metering system of the present invention is readily adapted to achieve the ends and advantages mentioned as well as those inherent therein. While presently preferred embodiments of the invention have been illustrated for the purpose of this disclosure, numerous changes in the arrangement and construction of parts may be made by those skilled in the art, which changes are encompassed within the spirit and scope of this invention as defined by the appended claims.

What is claimed is:

1. A material storage and metering system, comprising:

first storage means for storing a first solid phase material;

first metering means for transferring said first material from said first storage means at a controlled flow rate within a first range of flow rates, said first range being defined by a low end and a high end;

second storage means, for storing a second solid phase material, said second storage means having a capacity less than a capacity of said first storage means;

second metering means for transferring said second material from said second storage means at a controlled flow rate within a second range of flow rate, said second range being defined by a low end and a high end, said high end of said second range being at least substantially as great as said low end of said first range;

a transportable frame having ground engaging means for allowing said frame to traverse a ground surface, said first and second storage means and said first and second metering means being mounted upon said frame for transport therewith;

wherein said first storage means is supported from said transportable frame by a first support means and a load cell support means for sensing a weight supported by said load cell support means and for generating a signal representing said weight, said load cell support means including a lift means movable between a first position wherein said load cell support means is held in load supporting engagement with said first storage means and a second position wherein said load cell support means is held out of load supporting engagement with said first storage means; and wherein said load cell support means and said first metering means are connected to a common power source and are so arranged and constructed that when power is supplied from said source to said first metering means power is also supplied to said lift means to move said lift means to its said first position, and when power is disconnected from said first metering means power is also disconnected from said lift means so that said lift means returns to its said second position.

2. The system of claim 1, wherein:

said common power source is a hydraulic power source; and said lift means includes a hydraulic cylinder arranged to extend upon supply of hydraulic power thereto.

3. The system of claim 2, wherein:

said first support means is further characterized as being a support means for providing at least one degree of freedom of movement of said first storage means relative to said transportable frame.

4. The system of claim 3, wherein:

said first support means includes a ball and socket supporting joint.

5. A material storage and metering system, comprising:

first storage means for storing a first solid phase material;

first metering means for transferring said first material from said first storage means at a controlled flow rate within a first range of flow rates, said first range being defined by a low end and a high end;

second storage means for storing a second solid phase material, said second storage means having a capacity less than a capacity of said first storage means;

second metering means for transferring said second material from said second storage means at a controlled flow rate within a second range of flow rates, said second range being defined by a low end and a high end, said high end of said second range being at least substantially as great as said low end of said first range;

a transportable frame having ground engaging means for allowing said frame to traverse a ground surface, said first and second storage means and said first and second metering means being mounted upon said frame for transport therewith;

wherein said first metering means includes:
 a metering bin means for receiving said first material from said first storage means;
 a conveyor means for discharging said first material from said metering bin means at a controlled rate within said first range of flow rates;
 wherein said metering bin means is supported from said transportable frame by a first support means and a load cell support means for sensing a weight supported by said load cell support means and for generating a signal representing said weight, said load cell support means including a lift means movable between a first position wherein said load cell support means is held in load supporting engagement with said metering bin means and a second position wherein said load cell support means is held out of load supporting engagement with said metering bin means; and wherein said load cell support means and said conveyor means are connected to a common power source and so arranged and constructed that when power is supplied from said source to said conveyor means power is also supplied to said lift means to move said lift means to its said first position, and when power is disconnected from said conveyor means power is also disconnected from said lift means so that said lift means returns to its said second position.

6. The system of claim 5, wherein:

said common power source is a hydraulic power source; and said lift means includes a hydraulic cylinder arranged to extend upon supply of hydraulic power thereto.

7. The system of claim 5, wherein:

said first support means is further characterized as being a support means for providing at least one degree of freedom of movement of said metering bin means relative to said transportable frame.

8. The system of claim 7, wherein:

said first support means includes a ball and socket supporting joint.

9. A portable material handling system, comprising:

a transportable frame having ground engaging means for allowing said frame to transverse a ground surface; and container means, supported from said transportable frame by a first support means and a load cell support means for sensing a weight supported by said load cell support means and for generating a signal representing said weight, for containing a material, said load cell support means including a lift means movable between a first position wherein said load cell support means is held in load supporting engagement with said container means and a second position wherein said load cell support means is held out of load supporting engagement with said container means.

10. The system of claim 9, further comprising:

a metering means for transferring said material from said container means; and wherein said load cell support means and said metering means are connected to a common power source and are so arranged and constructed that when power is supplied from said source to said metering means power is also supplied to said lift means to move said lift means to its said first position, and when power is disconnected from said metering means power is also disconnected from said lift means so that said lift means returns to its said second position.

11. The system of claim 10, wherein:

said load cell support means further includes a transportation mode support means for supporting said container means when said lift means is in its said second position.

12. The system of claim 10, wherein:

said common power source is a hydraulic power source; and said lift means includes a hydraulic cylinder arranged to extend upon supply of hydraulic power thereto.

13. The system of claim 12, wherein:

said first support means is further characterized as being a support means for providing at least one degree of freedom of movement of said container means relative to said transportable frame.

14. The system of claim 13, wherein:

said first support means includes a ball and socket supporting joint.

* * * * *